March 18, 1941.   A. J. BAZELEY   2,235,137
CAR COUPLING AND SUPPORTING APPARATUS
Original Filed Dec. 5, 1935   6 Sheets-Sheet 3

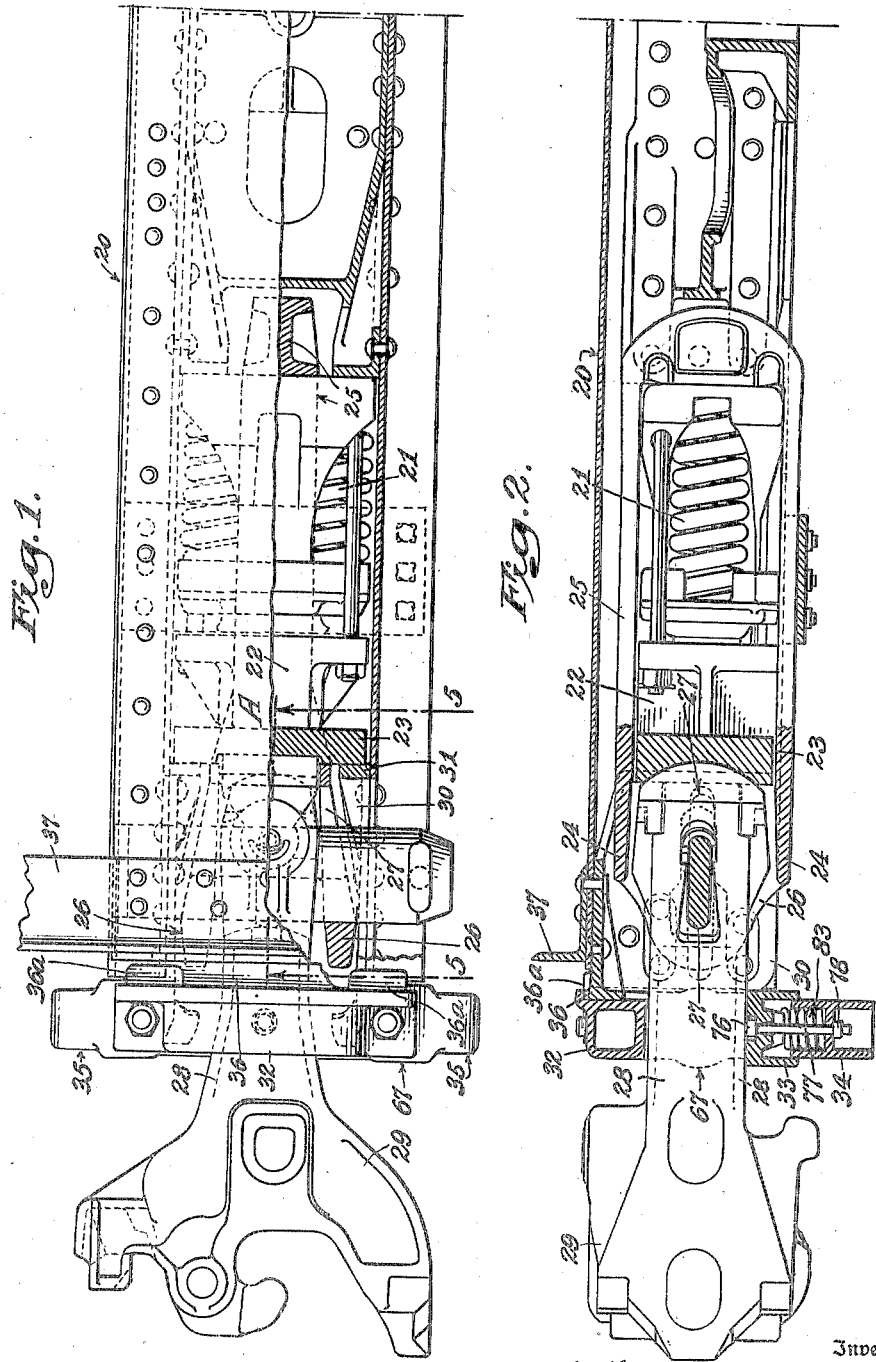

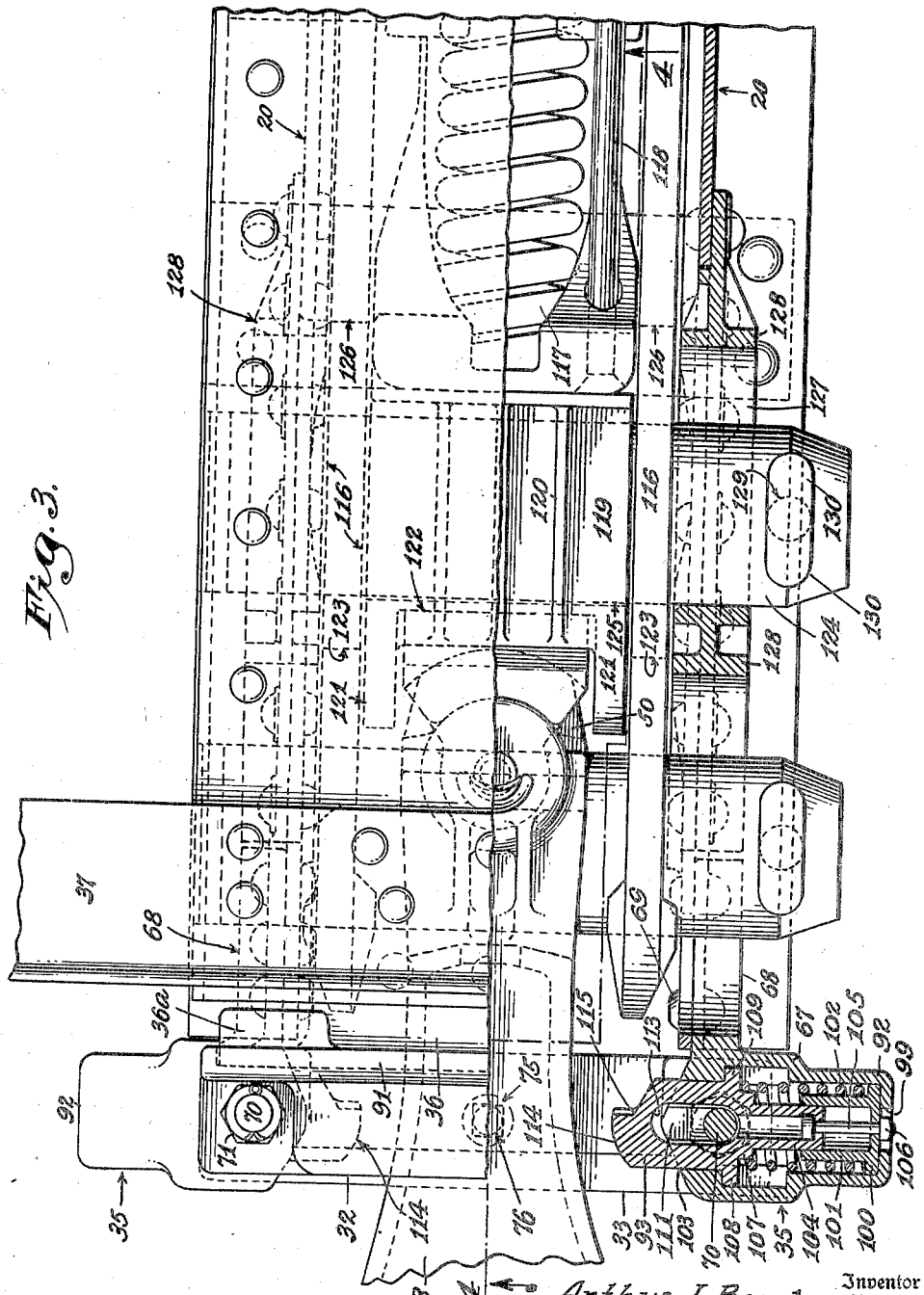

Inventor
Arthur J. Bazeley, deceased,
By Ruth McKean Bazeley,
Executrix,
by Clarence D. Kerr
Attorney March 18, 1941.  A. J. BAZELEY  2,235,137
CAR COUPLING AND SUPPORTING APPARATUS
Original Filed Dec. 5, 1935  6 Sheets-Sheet 4
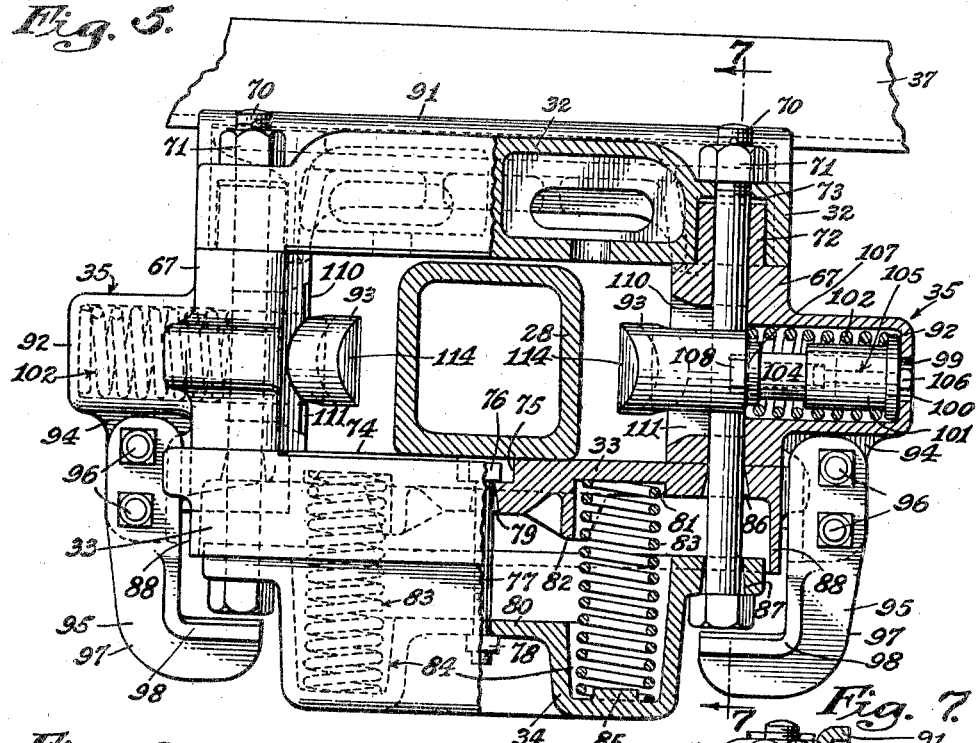
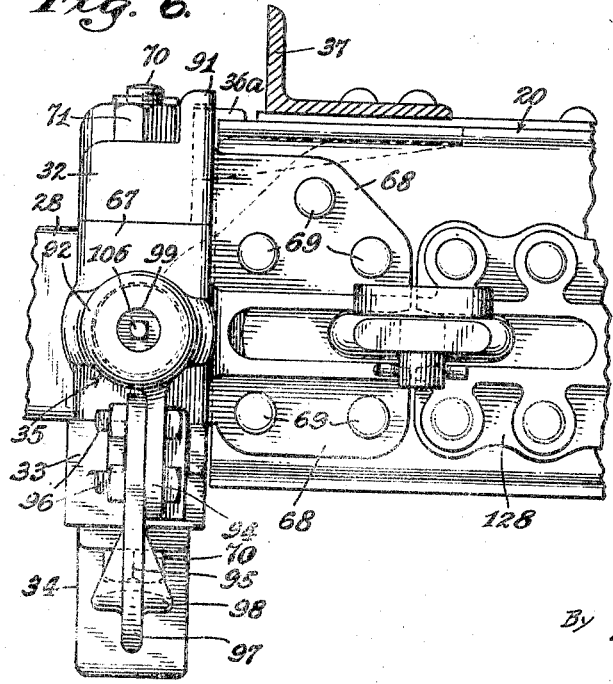
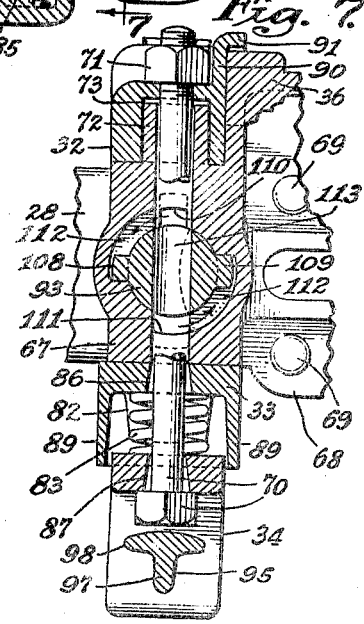
Inventor
Arthur J. Bazeley, deceased
By Ruth McKean Bazeley, Executrix,
by Clarence D. Kerr
Attorney

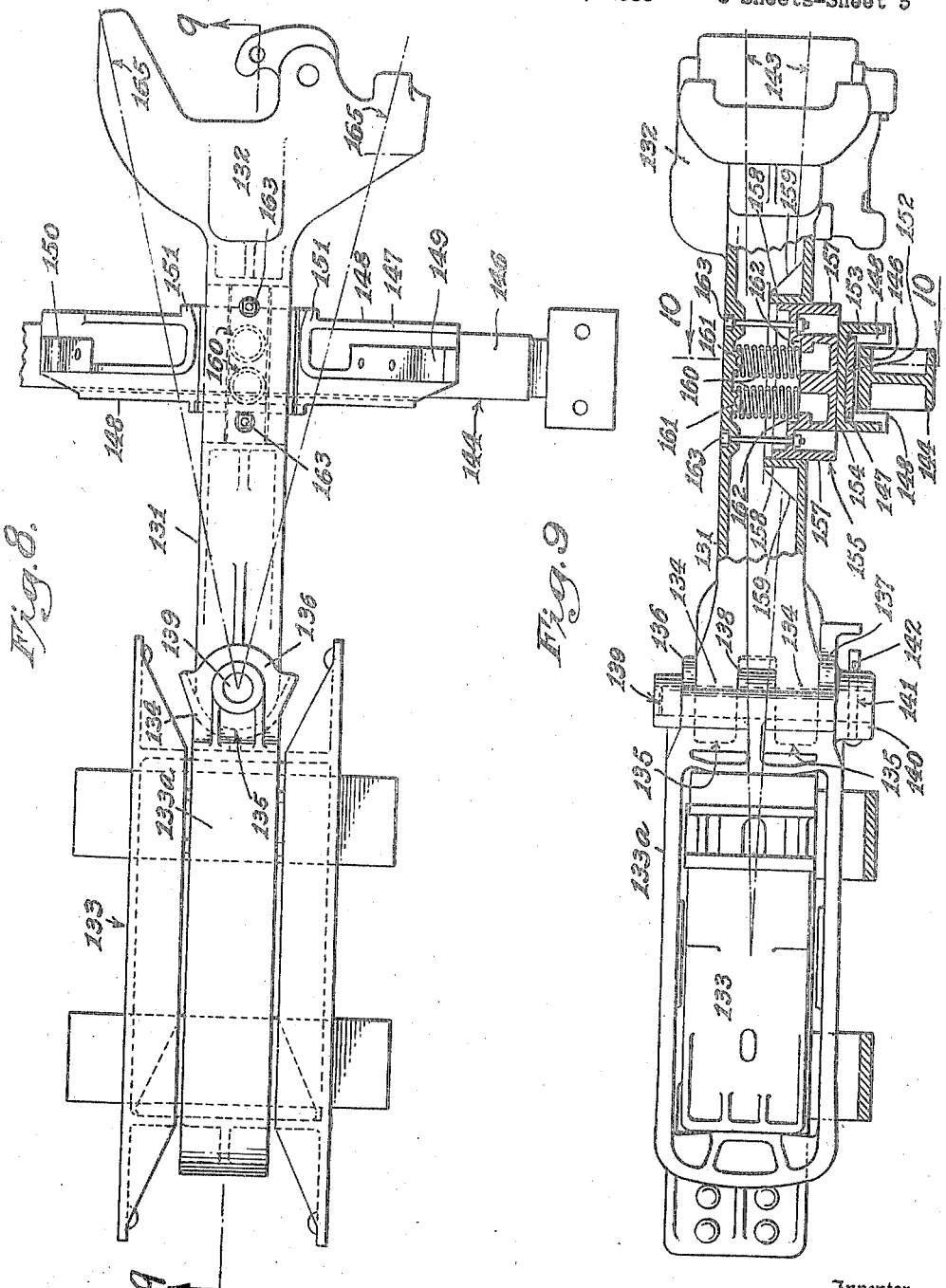

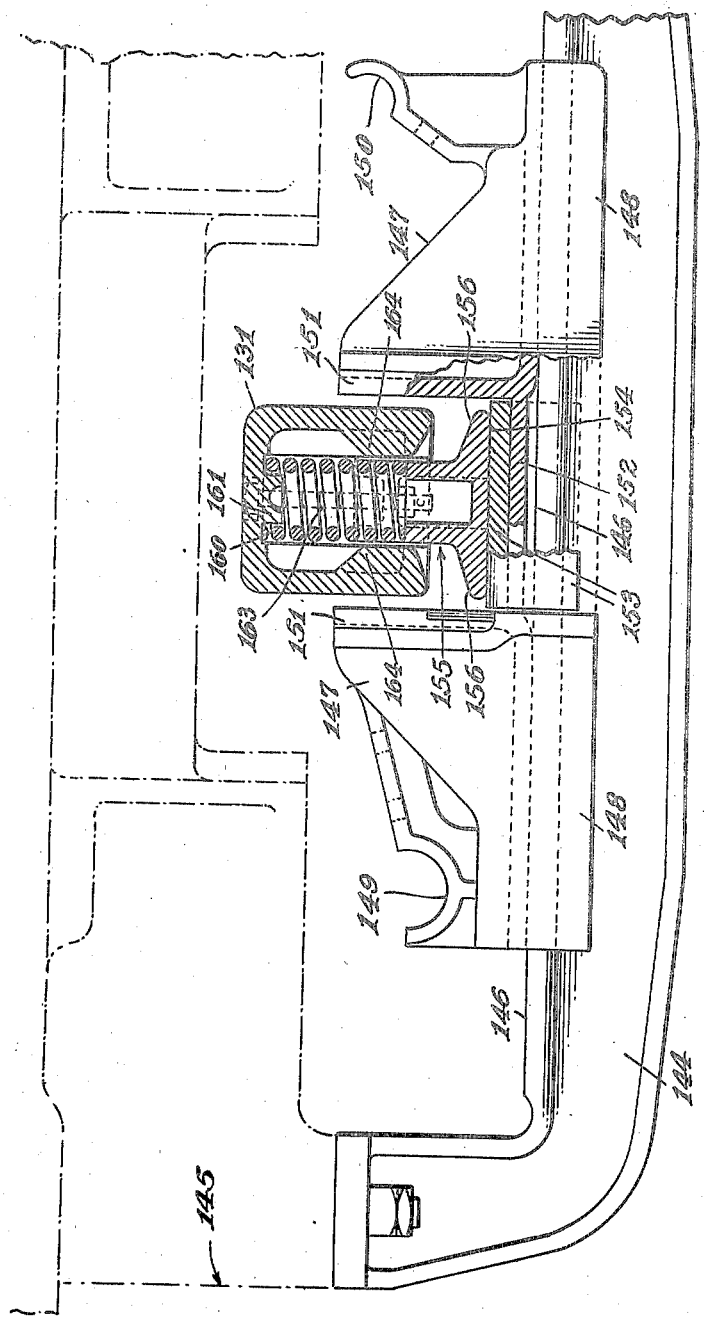

Patented Mar. 18, 1941

2,235,137

UNITED STATES PATENT OFFICE 2,235,137

CAR COUPLING AND SUPPORTING APPARATUS

Arthur J. Bazeley, deceased, late of Shaker Heights, Ohio, by Ruth McKean Bazeley, executrix, Shaker Heights, Ohio, assignor to National Malleable and Steel Castings Company, Cleveland, Ohio, a corporation of Ohio Original application December 5, 1935, Serial No. 53,012. Divided and this application July 27, 1938, Serial No. 221,530

2 Claims. (Cl. 213—14)

This invention relates to improvements in car couplers and more particularly to a car coupler which may be tightly locked to another coupler of the same construction in order to substantially eliminate coupler slack, and to facilitate the automatic connection of hose lines, electric cables and the like when two cars are coupled together. By the use of such automatic connectors, the necessity and attendant dangers of having a person crawl in between two cars to connect or disconnect these lines are also eliminated.

One difficulty encountered in providing a practical tight-lock coupler resides in the fact that a certain amount of lateral and vertical angling must be made possible between two cars so that too great a strain will not be placed on the coupler head and knuckle when a train is traveling on a curved or graded track. This angling is largely taken care of with the Standard E coupler having a 10A contour by the shape of the coupler heads and knuckles. Thus, according to present usage, the shanks of two couplers in coupled relationship may be angled both vertically and laterally with respect to each other. With a coupler tightly locked to a similar coupler, angling at the coupler faces is impossible and, in any case, hinders the use of automatic train line connectors.

One feature of this invention, therefore, resides in an improved coupler shank mounting or carrier construction by means of which the coupler shanks may be angled both vertically and laterally with respect to the car carrying the same. A particular feature of the improved carrier resides in the provision of resilient means for resisting movement of the coupler shank in any direction.

A further object of this invention is to provide a centralizing mechanism adapted to be mounted on the car intermediate the ends of the coupler shank, whereby the coupler in uncoupled position is maintained in a position in which it is readily enabled to engage another coupler.

A further object of the invention is to provide a coupler and knuckle adapted to cooperate with a similar coupler in such a manner that the two knuckle noses may be tightly interlocked and the knuckle faces may also be pressed directly against the opposing coupler faces. As a practical matter, it is impossible to immediately change existing coupling equipment on railways replacing all of such equipment with this improved tight-lock coupler. A particular and very important feature of this invention, therefore, resides in the provision of a tight-lock coupler having the advantages described above when coupled with a similar tight-lock coupler, and which is also adapted for coupling with equipment now in use, such as the Standard E coupler having a 10A contour. This Standard E coupler with the 10A contour will hereafter be referred to as a normal coupler or a normal contour.

A further feature of the invention is the provision of a coupler with a knuckle having a contour intermediate the contour of the tight-lock coupler and the normal or 10A contour, which may be termed a semi-tight coupler. Such a semi-tight coupler is adapted to cooperate with normal couplers, another semi-tight coupler or the improved tight-lock coupler. This semi-tight coupler is designed to take care of vertical and lateral angling, in part at the coupler face, and in part by means of the connection between the coupler shank and the car. Thus by using couplers in accordance with this invention proper vertical and lateral angling may be obtained under all conditions.

The above features and advantages may be better understood in connection with the accompanying drawings. In addition, several constructional features, objects and advantages of this invention, which have not been mentioned above, will be pointed out in connection with the following description of the embodiments of the invention illustrated in the drawings, in which:

Figure 1 is a top plan view, partly in section, showing a tight-lock coupler attached to a vertical yoke of a draft gear in a car and also illustrating the improved flexible carrier of this invention.

Figure 2 is a side elevation of the assembly shown in Figure 1 with parts of the carrier and related members being shown in section.

Figure 3 is a top plan view, partly in section, showing a coupler shank swivelly attached to a draft rigging provided with a horizontal yoke.

Figure 5 is a front view of the flexible carrier and striking casting as viewed from the left-hand side of Figure 4, with the coupler shank and parts of the carrier and striking casting being shown in cross section.

Figure 6 is a detailed side elevation of the striking casting assembly as viewed from the right side of Figure 5, illustrating the forward end of the draft sill, the cheek plate, the carrier assembly, and associated parts.

Figure 7 is a vertical detailed cross section, taken on the line 7—7 of Figure 5.

Figure 8 is a plan view illustrating a modification of the invention showing a tight-lock coupler, with a rigid shank mounting, and a novel carrier therefor.

Figure 9 is a side elevation of the assembly of Figure 8 taken on the line 9—9 thereof with the modified coupler shank support shown in cross section.

Figure 10 is an enlarged view, taken on the line 10—10 of Figure 9, showing the coupler shank and supporting members in section and the other related parts in elevation.

Figure 4:
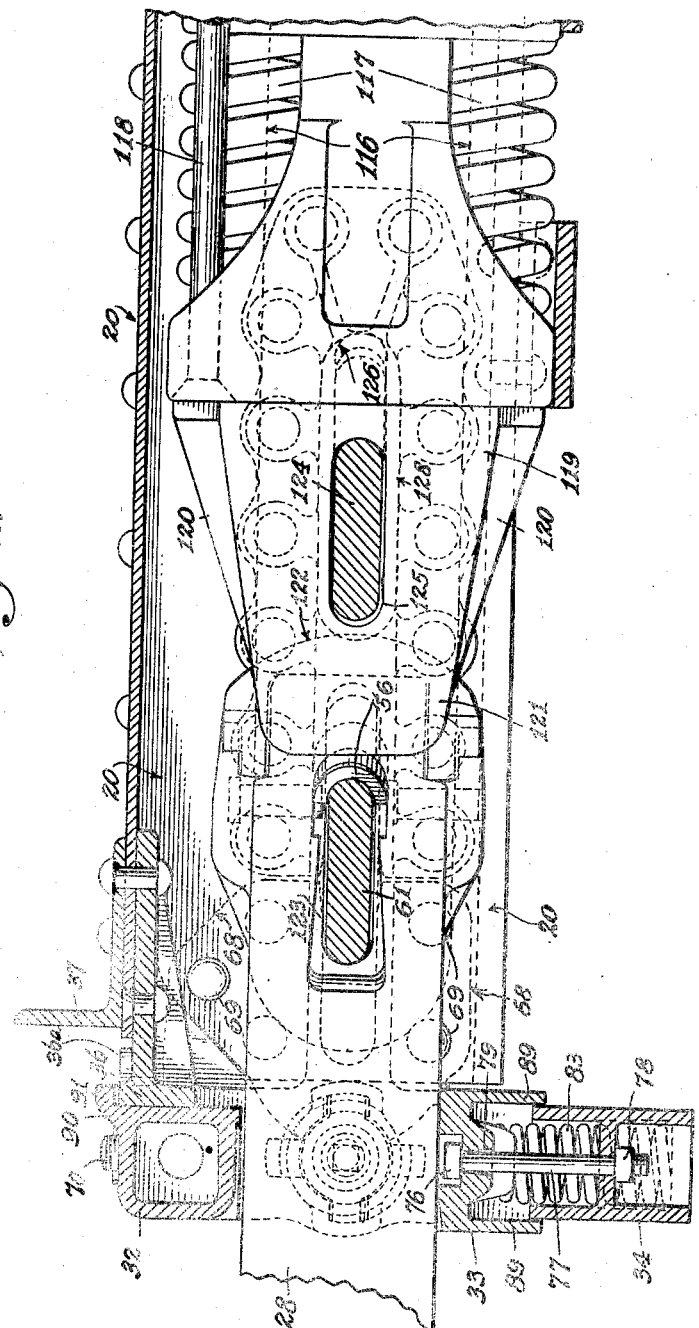
Figure 4 is a vertical cross section of the assembly shown in Figure 3, with some of the parts in elevation and taken on the offset line 4—4 of Figure 3.

Referring more particularly to the assembly illustrated in Figures 1 and 2, numeral 20 indicates the center sill of a car, in which a draft gear 21 of the friction type is suitably mounted. One end of this draft gear is provided with a member 22 which bears against a follower block 23, mounted for sliding movement between the vertically disposed arms 24 of the yoke 25. Yoke 25 is also provided with a pair of horizontally disposed arms 26 having key slots 27. Suitably connected to this draft gear yoke, as by key 61, is a coupler shank 28 carrying a coupler head 29. Attached to the sides of the sill near the end thereof are supporting brackets 30 having the inner ends 31 projecting inwardly to limit forward movement of the follower block 23. These brackets are preferably made integral with carrier supports 67 adapted to support a striking casting 32, a carrier iron 33, and a carrier spring support 34, together with a pair of lateral coupler shank buffers 35, 35 for yieldingly supporting the coupler while allowing vertical and lateral angling between the coupler shank and the center sill of the car. The bracket 36, suitably reinforced by lugs 36a, serves to guide and limit downward movement of the striking casting as referred to hereafter; numeral 37 indicates the end sill of the car.

The carrier assemblies which support the coupler shank are best shown in Figures 1, 2, 3, 4, 5, 6 and 7. The striking casting 32, may be supported by a carrier bracket or cheek plate such as is shown at 30 in Figures 1 and 2 in which a vertical yoke is used or at 68 in Figures 3, 4, 5, 6 and 7 in which a horizontal yoke is used. The cheek plates 30 or 68 may be made integral with the carrier supports 67, and are secured to the car sills by the rivets 69.

The striking casting 32, the carrier iron 33, the carrier spring support 34, and the carrier supports 67 may be all held in assembled relation by means of the bolts 70 and the nuts 71. A rectangular opening is thereby provided between the two carrier supports 67, the striking casting 32, and the carrier iron 33, adapted to receive the coupler shank 28. This opening is preferably proportioned so that only a very limited vertical movement of the coupler shank is possible without contacting either the carrier iron or the striking casting, while considerable space is left for lateral movement of the coupler shank between the two supports 67. Free lateral movement of the coupler and shank is desirable to facilitate coupling on a curve. Supports 67 may be provided with dowels 72 at the top thereof adapted to be seated in the recessed end portions 73 of the striking casting 32 so that the latter may be moved upwardly in sliding engagement therewith.

The carrier iron 33 and the carrier spring support 34 are assembled as a single compressible unit. The carrier iron has a top surface 74 which may be made of wear resistant metal to support the coupler shank. A recess 75 is formed in the central portion of this top surface to receive the head 76 of the bolt 77 which, with the nut 78, holds the carrier iron and carrier spring support together. Bolt 77 passes through a downwardly flared opening 79 in the carrier iron and through an opening in the upwardly extending central section 80 of the carrier spring support 34.

The lower surface of the carrier iron is preferably recessed on each side of the bolt 77 as shown at 81 and is provided with downwardly extending flanges 82 which define seats for the springs 83. The carrier spring support is formed with pockets 84 which provide seats for the lower ends of these springs 83. Suitable dowels 85 may be provided in these pockets, if desired, to insure retention of the springs 83 in their correct position. Bolts 70 pass through flared openings 86 in the carrier iron and flared openings 87 in the carrier spring support so that either of these members will be free to slide up or down the bolt without stressing it. Hence, the assembly comprising the carrier iron and carrier spring support is supported by the heads of the bolts 70, and the carrier iron is adapted to move downwardly against the action of the springs 83, being guided by the bolts 70. Smiliarly, the carrier spring support may move upwardly in a fixed path against the action of the springs 83. The carrier iron is preferably provided with vertical depending end walls 88 and side walls 89, which may be tapered, to receive the carrier spring support upon compression of the springs 83 in telescoping relationship.

The striking casting is preferably provided with an upwardly extending flange 90 having a horizontal top portion 91. The flange 90 is arranged to bear against the bracket 36, thereby further limiting downward movement of the striking casting with respect to the center sill and providing a vertical guiding surface for the striking casting.

Supports 67 are preferably formed with integral cylinder portions 92 adapted to receive the plungers 93 which comprise the lateral guides or buffers 35 for the coupler shank. Safety brackets 95 are preferably attached by bolts 96 to depending bracket arms 94 which are also formed integral with the cylinders 92 and the supports 67. These safety brackets may be L-shaped and formed with a main rib 97 and flanges 98 with the lower portion of the L extending underneath the bolts 70. If desirable these safety brackets may be formed with a lug on one side in such a position that it would interfere with the application of the bracket except in the proper position. Thus, in the event of a failure of the bolts 70, or of nuts 71 becoming loosened, the coupler shank will be prevented from falling downwardly, and will be maintained in the correct position until the necessary repairs can be effected.

Referring more particularly to Figures 3, 5, 6 and 7, it may be seen that the cylinders 92 are formed with openings 99 in the outer ends thereof. These cylinders are adapted to carry bolt-shaped members having a head 100 and a hollow cylindrical shank 101. The heads of these members act as spring seats and the shanks thereof in cooperation with the walls of the cylinder 92 as guides for the springs 102. Buffer plungers 93 are inserted in the openings 103 in the sides of the supports 67, and are formed with piston-like end sections 104 of reduced cross section adapted to telescope into the hollow shanks 101. These end sections 104 are preferably also hollow and provided with an opening through which the bolts 105 may be passed, so that the nuts 106 in cooperation therewith may maintain the buffers 93 and the bolt-shaped members as a unit under compression of the springs 102. Compression of these members against the springs 102 is limited by the abutments 107 on the buffers 93 which are arranged to strike the ends of the shanks 101 just before the springs go solid. Buffers 93 are preferably formed with wings 108 and 109 of different size, which may be inserted in the correspondingly sized openings 110 and 111 in the side walls of the supports 67. The buffers 93 can thereby be inserted in only the correct way.

These buffer units may be assembled separately and inserted as units in cylinders 92. After insertion of the wing projections 108 and 109 through their respective openings the buffer assemblies may be rotated 90°, as indicated by the arrows in Figure 7, the wings 108 and 109 traveling in slots 112. This brings the elongated slots 113 of the plungers 93 into a vertical position (see Fig. 3) so that the bolts 70 may be passed therethrough, to retain the buffers against rotation and to hold the buffer assemblies in their respective cylinders. The outer ends of the buffer elements may be curved, as at 114, to cooperate with the shank of the coupler which may be flared at about this point. These buffer elements also preferably have cut-out or notched portions, as at 115, to provide for receiving the ends of the yoke arms when the draft gear is under compression. The notches 115 are preferably sufficiently large to keep the yoke arms from striking the plungers 93. By the use of wings 108 and 109 of different size, the plungers can only be inserted with the openings 115 in the correct position.

In the operation of this coupler shank supporting structure, the shank is free to move longitudinally within the usual limits except as it may be restrained by the draft gear. The plungers 93 compressed against the springs 102 serve to yieldingly urge the coupler shanks into a substantially central position. When the shank is lifted with respect to the car, the striking casting is lifted thereby and acts through the bolts 70 to lift the carrier spring support 34. The carrier iron 33 is prevented from moving upwardly by the supports 67, and hence the springs 83 are compressed, tending to exert a resilient pull upon the top of the coupler shank through the supporting bolts 70 and casting 32 and cause it to return into the central position. When the coupler shank is moved downwardly with respect to the car, the carrier spring support is rigidly maintained in position by the bolts 70 and the carrier iron moves downwardly, again compressing the springs 83. It is apparent, therefore, that in the improved supporting structure of this invention, a single pair of springs is used to oppose resiliently vertical movement of the coupler shank in either direction.

As previously mentioned, the improved flexible carrier arrangement and swivel butt of this invention may be employed in connection with draft gear equipment embodying a horizontal yoke, as illustrated in Figs. 3 and 4, having the usual horizontally disposed yoke arms 116, surrounding a draft gear 117, of any desirable construction. Attached to the forward end of the draft gear, as by draft gear bolts 118, is a front follower block 119 having suitable reinforcing ribs 120 on the top and bottom thereof and provided with a pair of horizontally disposed arms 121. This follower block is arranged to slide between the yoke arms 116, and is provided with an uninterrupted vertically curved surface 122, adapted to cooperate with a similarly curved surface on a radial butt piece. A key slot in the coupler shank is adapted to receive the key 61 which seats in suitable slots 123 in the yoke arms 116. Forward motion of the front follower block 119 is limited by a key 124, which seats in the relatively tight fitting slot 125 in the follower block and in elongated slots 126 in the yoke arms 116 and the elongated slots 127 in the cheek plates 128. With such an arrangement the coupler shank acts on the yoke arms 116 through the key 61 to move the rear end of the yoke and draft gear forwardly. Key 124 holds the forward end of the draft gear against movement, thus compressing the springs. On buff, the coupler shank acts directly on the follower block 119 and causes it to compress directly the draft gear springs. The rear end of the draft gear may be held against movement during buff by a third key, stop lugs, or in any other suitable manner. Attached to the center sill 20 of the car are two sets of cheek plates 68 and 128. Cheek plates 68 are integral with the carrier supports 67. The two sets of cheek plates define slots and provide supports for the keys 61 and 124. Key 124 may be held in place by a pin 129 having a suitable handle portion 130.

The swivel butt connection referred to above is described in more detail and is claimed in a separate divisional application Ser. No. 221,529, filed July 27, 1938.

In Figures 8–10 are illustrated a simplified arrangement for supporting resiliently a tight-lock or semitight coupler of this invention for use in passenger service, in which vertical angling conditions are not as extreme as in freight service because of the employment of humps in classification yards.

In this modification of the invention, the coupler shank 131, carrying the coupler head 132, may be pivotally attached to a suitable draft gear 133 for angling laterally with respect to the draft gear, but not vertically to any substantial extent. The butt end of the shank may be bifurcated to provide a pair of arms 134, having horizontally curved bearing surfaces 135. The forward end of the yoke 133a may be provided with a pair of spaced arms 136 and 137 and with a centrally disposed arm 138 arranged to form two openings to receive the arms 134 of the coupler butt. These members may be suitably secured together in pivotal relation by a pin 139, which also extends through the boss 140. A smaller pin or key 141 may be passed through the boss 140 and pin 139 to retain the same in place and this key in turn is held by a suitable bendable cotter pin 142.

Thus, the coupler shank is free to angle laterally with respect to the draft gear, but provision is not intended to be made for vertical angling at this point. Adequate provision for vertical angling, however, is made in this arrangement since the draft gear itself may be tipped about its center, against the action of its springs, so that angling may take place to the extent indicated by the lines 143.

The shank is supported intermediate its ends by a rigid carrier iron 144, which is preferably firmly attached to the car 145. This carrier iron may advantageously be made in the shape of an H beam, as illustrated in Figure 9, with one side of the H forming an upper bearing surface 146, upon which a wear shoe 147 has a sliding engagement. This wear shoe has depending side flanges 148 which embrace the edges of the top portion of the carrier iron 144 and hold it in operative engagement therewith. Suitable sockets 149 and 150, preferably integral therewith, may be provided near each end of this wear shoe to carry or support pipes, or other train lines. Automatic train line connectors may be readily employed therewith when this carrier structure is used in conjunction with the improved tight-lock coupler.

The central portion of the wear shoe 147 is provided with an opening defined by side walls 151 and a slightly raised bottom wall 152 for receiving the coupler shank 131 and allowing the same to have a free longitudinal movement. By using a raised bottom wall 152, the weight of the coupler is more uniformly distributed throughout the length of the wear shoe 147. A suitable wear resistant member 153, in the form of a channel section, may be placed over the base 152 to provide a wear resistant surface 154 for supporting the coupler shank. A suitable wear shoe 155 may be resiliently mounted in a lower portion of the coupler shank 131 to support the coupler shank on the wear resistant member 153. The shoe 155 is preferably provided with outwardly extending foot portions 156, of suitable wear resistant metal, to bear against the plate 153 and with end walls 157 for sliding engagement with the walls 158 at the front and rear sides of the opening in the under side of the coupler shank. The walls 158 may be suitably strengthened by ribs 159. Springs 160 are preferably retained in position within the coupler shank by dowels 161 on the lower surface of the top wall of the coupler shank and by the recesses 162 in the top of the wear shoe 155. The wear shoe 155 and the springs 160 may be held assembled with the coupler shank 131 by suitable bolts 163.

The side walls of the coupler shank are preferably strengthened by thickening, as at 164, to compensate for the wear shoe opening in its bottom wall. Thus, the coupler and coupler shank are resiliently supported on the slidable wear shoe 148, which in turn is supported on the carrier iron 144. Such a supporting arrangement allows a considerable amount of lateral angling between two cars, as indicated in Fig. 8, by the lines 165. This form of carrier structure provides relatively small parts for receiving the frictional wear. Such parts may be economically made of special wear resistant metals.

This application is a division of application Serial Number 53,012 filed December 5, 1935, by Arthur J. Bazeley issued as Patent No. 2,178,062, Oct. 31, 1939.

The terms and expressions which have been employed are used as terms of description and not of limitation, and is no intention, in the use of such terms and expressions, of excluding any equivalents of the features shown and described or portions thereof, but it is recognized that various modifications are possible within the scope of the invention claimed.

It is claimed:

1. A car coupler having a hollow shank, a wear shoe for supporting the shank fitted into and guided by the sides of an opening in only one wall of said shank in telescoping relation therewith, spring means between an inner wall of said shank and said wear shoe, and adjustable means for holding said wear shoe within a predetermined distance from said inner wall.

2. A car coupler having a shank formed of top, bottom and side walls, said bottom wall having an opening therein and said top wall above said opening forming a spring seat, reinforcing means on the interior of said shank adjacent said opening, a supporting member extending into said opening and guided by portions of said reinforcing means, spring means between said seat and said member, and a bolt for holding said shank, spring means and supporting member in assembled position while permitting compression of said spring means.

RUTH McKEAN BAZELEY,
*Executrix of the Estate of Arthur J. Bazeley, Deceased.*